United States Patent [19]

Sheldrake et al.

[11] 4,139,342
[45] Feb. 13, 1979

[54] DYE IMPREGNATED PLASTICS FOR LASER APPLICATIONS

[75] Inventors: Stephen J. Sheldrake, Redondo Beach; Harry H. L. Wang, Los Angeles, both of Calif.

[73] Assignee: Hughes Aircraft Company, Culver City, Calif.

[21] Appl. No.: 816,619

[22] Filed: Jul. 18, 1977

[51] Int. Cl.$^2$ .................. D06P 3/00; D06P 5/00; H01S 3/00
[52] U.S. Cl. ................................ 8/4; 331/94.5 R
[58] Field of Search .......................... 8/4; 331/94.5

[56] References Cited

U.S. PATENT DOCUMENTS

| 3,740,761 | 6/1973 | Fechter | 8/2.5 A |
|---|---|---|---|
| 3,745,586 | 7/1973 | Braudy | 8/2.5 A |
| 3,751,587 | 8/1973 | Insler et al. | 8/2.5 A |
| 4,016,133 | 4/1977 | Hyosu et al. | 260/42.21 |
| 4,017,476 | 4/1977 | Murray et al. | 260/42.21 |

OTHER PUBLICATIONS

Drexhage, K. H., "Fluorescence Efficiency of Laser Dyes", J. Research National Bureau of Standards, -A, Physics and Chemistry, May–Jun. 1976, vol. 80A, No. 3, pp. 421–428.
Wegmann, J. et al., *Chem. Abstracts*, 1975, 83, 194,543m.
Tanaka, T., *Chem. Abstracts*, 1973, 79, 147,377t.
"Laser and Maser" in Encyclopedia Britannica, vol. 10 (1973), pp. 686–689.
"Dye Lasers", F. P. Schafer (Editor) (Springer, 1973), pp. 194–259.

*Primary Examiner*—A. Lionel Clingman
*Attorney, Agent, or Firm*—Booker T. Hogan, Jr.; W. H. MacAllister

[57] ABSTRACT

A process for doping laser dyes into plastic hosts is disclosed. This process allows the control of the doping profiles in order to achieve profiles, other than uniform, necessary for effective laser mode control, volumetric pumping, and stable resonators and oscillations during transverse pumping. In addition to the above-stated attributes, this process enables the production of dye impregnated plastics which lase at extended light wave lengths.

Dye impregnated plastics, prepared in accordance with this process, exhibit electro-optical characteristics previously unattainable with plastics prepared via conventional prior art processes.

8 Claims, No Drawings

DYE IMPREGNATED PLASTICS FOR LASER APPLICATIONS

BACKGROUND OF THE INVENTION

1. Field of the Invention

This invention is generally related to the preparation of doped plastics for use in laser operations. In particular, the invention is directed to novel dye doped lasing plastics and the process or controlled doping method for the preparation of dye impregnated laser plastics.

2. Background of the Invention

The use of a solid matrix such as a plastic for dye lasers obviates many of the common problems associated with static or flowing dye systems; e.g., convective schlieren, evaporation, flow fluctuation stagnation films, solvent or dye poisoning, system ruggedness and maintenance, and even explosions.

Prior art methods of producing dye impregnated plastics may generally be characterized as either bulk or solution polymerization methods whereby laser dyes are added to a solution of catalysts and monomers prior to polymerization, or at some point in time before the final polymerization of the monomers into a solid matrix. See for example Oster et al, *Luminescence in Plastics* Nature, Dec. 15, 1962, p. 1089 and Jones et al, *Temperature Effects on the Phosphorescence of Aromatic Hydrocarbons in Poly(methyl-methacrylate)*, Journal of Chemical Physics, Feb. 1969, p. 1134.

The chemical reactions that take place during these prior art bulk polymerization or solution polymerization processes, the temperature of the reactions, and the changing pH quickly destroy sensitive dyes. Therefore, these prior art processes are suitable for the doping of only a few plastic hosts with a few strong or insensitive laser dyes. The plastic hosts most suited for laser applications are polymethylmethacrylate (PMMA) polymers doped with laser dyes selected from the Rhodamine dye family because of the lasing efficiency exhibited by these dyes and the excellent stability exhibited by the host plastic. These materials when pumped by a pulsed high peak power pumping laser are suitable for lasing actions in the 0.55 to 0.62 micron wavelength range. Other dyes having electro-chemical properties suitable for use as a high efficiency doped lasing medium at longer wavelengths such as Carbazine 122 and Cresyl Violet are attacked by the prior art processes for incorporating them into suitable plastic hosts.

For fieldable laser applications, it is desirable to utilize solid laser mediums capable of lasing in a wide wavelengths range. Transparent polymethylmethacrylate impregnated with specific laser dyes have been shown to be a useful laser medium at specific wavelengths. See B. H. Soffer et al, "Continuously Tunable Narrow Band Organic Dye Laser," Appl. Phys. Ltr., Vol. 10, pp. 266–267 (1967). However, in order to obtain lasing actions over a wider wavelength region, additional dyes must be employed. The utilization of these dyes has been precluded by the inability to incorporate them into the plastic host, using prior art methods, without altering the dye characteristics. The dyes are either destroyed during the bulk process or they undergo a major change in their lasing character.

Prior art methods for the preparation of dye impregnated plastics exhibit the additional disadvantage, because of their bulk process nature, of producing dye impregnated plastics having uniformly distributed dye molecules throughout the host medium. This feature leads to exponential gain and index of refraction profiles when the medium is transversely pumped because of the exponential absorption of laser pumping energies.

Therefore, one purpose of this invention is to provide a dye impregnated plastic suitable for use as a lasing material that will yield a flat gain and index of refraction profile when pumped transversely.

A second purpose of this invention is to provide a dye impregnated plastic medium that lases at frequencies above 0.620 microns.

A further purpose of this invention is to provide a process for doping plastic host materials with sensitive laser dyes.

A still further purpose of this invention is to provide a process for selectively varying the dye concentration throughout a dye impregnated plastic medium.

THE INVENTION SUMMARY

In seeking to achieve the above-stated purposes of this invention, while avoiding the disadvantages of prior art processes for preparing dye impregnated plastics for laser applications, a dye impregnated plastic which lases at extended wavelengths and a process for impregnating sensitive laser dyes into a plastic host material has been invented.

This process allows all laser dyes, even the most sensitive, to be doped into all plastic hosts. In addition, this process allows the control of the doping profiles in order to achieve profiles other than uniform.

The process may be generally described as a concentration difference diffusion process. However, pertinent aspects of the process require, in addition to dye concentration control, temperature control, careful pH control and pressure control.

A previously cured plastic matrix such as acrylic, polymethylmethacrylate, or other suitable optical transmitting plastic, is immersed in a solution of dissolved organic lasing dye and a solvent. The pH of the solution is maintained, throughout the process, at that value insuring dye survivability. The solution temperature is raised and an atmospheric pressure is created to preclude solvent losses. After a time interval, which varies in accordance with the operator's particular objectives, the plastic matrix will be doped with the dyes dissolved in the solvent.

A non-uniform doped dye profile is obtained by controlling the cross-sectional area across which the diffusion may take place, the thickness of the plastic medium, the dye concentration, the time cycle, the temperature cycle, and/or by repeating the process treatment.

Novel dye impregnated PMMA plastic materials suitable for lasing applications at frequencies below 0.550 and above 0.620 $\mu m$ have been prepared in accordance with this invention.

DETAILED DESCRIPTION

In seeking to provide plastic lasing mediums suitable for a broad range of lasing frequencies, and therefore promote wavelength agility, that can be easily adapted to a fieldable laser device we have found it necessary to employ various dye impregnated plastic hosts, as lasing mediums which may be assembled in a rotatable or slidable unit.

Dyes belonging to the Xanthene family have been found to be useful in providing laser actions between 0.55 and 0.62, $\mu m$ when pumped with the doubled $Nd^{3+}$:YAG laser. These dyes are considered to be very stable (See K. H. Drexhage *Fluorescence Efficiency of*

*Laser Dyes*, Journal of Research of the NBS - Applied Physical Chemistry, Vol. 80A, No. 3, June 1976. Some dyes belonging to the Oxazine dye family such as Cresyl Violet have been shown to be useful in forming liquid mediums to lase between 0.635 and 0.655 μm when pumped with the doubled $Nd^{3+}$:YAG laser. However, attempts to impregnate plastic hosts with these dyes via conventional impregnation methods have resulted in poor lasing efficiencies.

Dyes belonging to the Carbon-Bridged dye family, such as the Carbazine series, are suitable to lase at wavelengths above 0.67 μm. However, attempts to impregnate plastic hosts, (such as PMMA, polyester resins, epoxies, etc.) via conventional methods, with these dyes resulted in the total destruction of the dyes.

A new process for incorporating laser dyes into plastic host has been invented which does not attack the dye or alter its characteristics. This process increases the damage threshold of the lasing mediums and allows one to provide lasing mediums having non-uniform doping profiles.

Initially, this process was intended to provide a method for impregnating plastic hosts with ultra-sensitive dyes such as the Carbon Bridged dyes:

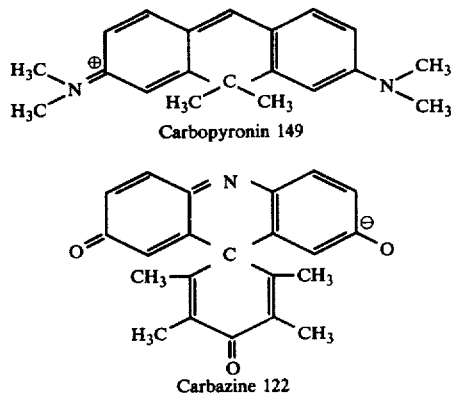

Carbopyronin 149

Carbazine 122 because prior art bulk polymerization doping processes tend to destroy these materials. However, subsequent studies showed that the process yielded doped plastics having improved lasing efficiencies when applied to dope oxazine dyes into solid plastic materials. Little or no alteration of the lasing characteristics of dyes belonging to the oxazine family were observed when PMMA was doped with these materials employing this process. This phenomena is in marked contrast to the results observed when plastic host materials containing oxazine dyes are prepared via conventional prior art processes.

Other laser dyes such as those belonging to the Xanthene dye family, which lase in the visible range of the spectrum, and the 7-Aminocoumarins, which lase in blue and green regions of the spectrum, as well as dyes which do not lase may be doped into plastic hosts via this process without being damaged or undergoing alterations of their dying or lasing characteristics.

Some examples of laser dyes doped into PMMA via this process are Rhodamine 6G, Rhodamine 6G Perchlorate, Rhodamine 640, Kiton Red 620, Sulforhodamine 101, Rhodamine 110, Rhodamine B, Cresyl Violet and Carbazine 122. Laser dyes such as Oxazine 170, Nile Blue A Perchlorate, 3,3'-Diethylthiodicarbocyanine Iodide, (OTOC), 3,3'- Diethylthiatricarbocyanine Iodide (OTTC), 7-Diethylamino-4 Methyl Coumarine and Coumarine, while not useful for our purposes may also be doped via this process.

The bulk of our studies involved high efficiency, sensitive laser dyes which lase at frequencies above 0.62 μm with the Q-switched doubled $Nd^{3+}$:YAG laser as the pumping source. Other pumping sources may be used as desired.

A dye-solvent solution is prepared at room temperature by dissolving the dye in a suitable solvent. The concentration of the dye in this solution may range from $5 \times 10^{-5}$ molar to $2 \times 10^{-3}$ molar depending upon the dye selected as the dopant and the thickness of the host medium.

solvents suitable for this process are those generally characterized as slightly polar solvents. Methanol and Ethanol are preferred because of their compatability with the preferred plastic host material. Other slightly polar solvents such as diluted acetone and diluted methyl ethyl ketone will work with some plastics. An excellent list of laser dyes, their modes of excitation, their lasing frequencies and suitable solvents is presented in an article by K. H. Drexhage entitled "Structure and Properties of Laser Dyes," published in Vol. 1 of *Topics in Applied Physics Dye Lasers*, edited by F. P. Schafer at pages 180 et seq.

In certain instances a solvent mixture may be required in which additives are added to control the pH of the solution. The pH limits of the solution are dependent upon the particular dye employed. This information is available in tables and data sheets prepared by the manufacturers of the respective dyes.

The distribution profile within the plastic medium is determined by the dye-solvent solution concentration, the temperature of the solution and the time of exposure of the plastic host to the dye-solvent solution.

In those instances where a uniform doping profile is desired, the plastic host material is totally immersed in the dye solution. However, in order to achieve a non-uniform doping profile, it is necessary to control or limit the surface area, of the host material, that is exposed to the dye solution. This is achieved by selectively masking specific surfaces of the host material, thereby limiting the exposed cross-sectional area. The masked surface host material is then immersed in the dye solution for a preselected time interval based on the nature of the host material and the rate of diffusion of the solvent into the host material.

An alternative way of producing a non-uniform doped profile, in the plastic host, is to form dye-solvent solutions of varying dye concentrations. The host material may then be sequentially exposed to the various solutions for selected time intervals thereby producing the desired variant doping profile.

The doping process is preferably carried out in a closed pressure environment in order to maintain the dye-solvent concentration within narrow limits. However, other techniques which achieve this objective, such as monitoring the dye concentration and periodically adding solvent as needed, may be employed to maintain a desired dye-solution concentration as a function of time.

The rate of diffusion is strongly dependent upon the temperature and character of the solvent employed to form the dye solution. An elevated temperature is desired to increase the rate of diffusion. However, an upper limit below that in which solvation between the plastic and the solvent occurs is observed. Excessive temperatures are contraindicative for dye survivability as well as the maintenance of a constant dye concentration. In most instances temperatures between 50° and 65° will provide reasonable diffusion rates without creating dye concentration control problems or attacking the dye.

Doped samples are removed from the dye solution and placed in an oven at approximately 70° C to remove excess solvent and dye-solvent solution. After 1 to 2 weeks of drying at this elevated temperature, or some temperature less than 95° C, the samples may be allowed to cool to ambient temperature. Annealing at elevated temperatures is sometimes employed to ensure the absence of stresses within the doped materials.

While PMMA is a prefered host material, for laser applications, this process may be utilized to impregnate other plastic, such as polystyrene, epoxy, and various polyester resins, where either a non-uniform doping profile is desired or the dopant dye is sensitive to heat and/or changing pH levels which occur during bulk polymerization processes.

Immersion intervals of from one to two weeks in dye solutions at temperatures on the order of 65° C are adequate to provide a uniform doping profile of carbazine 122 in a PMMA host material approximately ¼ inch thick where the dye solvent was ethanol. Solvation between PMMA and ethanol begins to occur at higher temperatures.

A totally unexpected, though well received, by-product of this process is an increase in the damage threshold level of the plastic mediums irrespective of the dopant. For example, samples of PMMA, bulk polymerized with $10^{-4}$M Rhodamine 6G, exposed to a multimode 0.53μm Q-switched doubled $Nd^{3+}$:YAG laser pulses exhibited signs of damage at an average power ($P_{th}$) of 1 watt/cm². In contrast, samples of PMMA doped with $10^{-4}$M Rhodamine 6G via the diffusion process of this invention showed no damage at the maximum experimental power density (38 watts/cm² average power).

An additional advantage of doping a plastic host material as facilitated by this invention lies in the ability to reduce the dye bleaching problems. The bleaching process of dye molecules in a liquid or solid solvent characterizes its photochemical stability to a great extent. In a somewhat over-simplified explanation, once dye molecules are bleached, they no longer absorb pump light. In plastic dye impregnated mediums, this problem is solved by either scanning the pump beam or moving the dye matrix. In fact, it has been shown that a plastic dye medium can be made to traverse transversely across the pump beam at a much higher speed than that of flowing liquid mediums.

The provision of high efficiency doped plastics exhibiting the added advantages of high damage threshold reduced bleaching problems and extended lasing frequencies is the result of this invention. These properties were not expected in view of prior art processes for preparing dye impregnated plastics. Specific examples of this process as used to impregnate PMMA with Carbazine 122 and the results obtained via tests of laser mediums fabricated from these doped materials are shown below.

EXAMPLE I

First, dissolve 54.099 mg of Rhodamine 6G perchlorate (M.W. = 540.99) into 1000 ml of 200 proof anhydrous ethanol to prepare a solution with $10^{-4}$M dye concentration. A piece of PMMA, with a dimension of ⅛ × 2 × 2, was immersed in the solution. Temperature was raised to 65° C for 1 week. After that the plastic was taken out of the solution and dried inside an oven at 65° C for 1 week. Finally the plastic was annealed at 95° C, between two pieces of flat glasses for 2 hours. The resulting dye-bearing plastic material exhibits uniform dye concentration and good optical property performance: Conversion efficieny equal to 47% when pumped with a pulsed, Q-switched, $Nd^{3+}$:YAG laser and using a suitable dye laser cavity. Peak lasing wavelength is 0.565 μm.

EXAMPLE II

Same process as shown in Example 1, except using Carbazine 122 (M.W. = 345).

Carbazine 122 = 690 mg
ETOH = 1000 ml
KOH = Enough to make PH ≧ 9
Plastic (PMMA) = ⅛ × 2 × 1
Dye Diffusion at 65° C for 1 wk
Plastic Drying at 65° C for 1 wk
Annealing: 2 hr at 95° C.

The resulting plastic has a dye concentration close to 2 × $10^{-3}$M. It will have the following performance characteristics: 30% conversion efficiency when pumped with a doubled, Q-switched $Nd^{3+}$:YAG laser and using a suitable cavity. Peak lasing action occurs at 0.685 μm.

EXAMPLE III

Carbazine 122, same process as shown in Example 2 except use a strong solvent, acetone. The plastic was dissolved completely and dye was destroyed during the process. This example has been included to show the effect of improper solvent selection on the process.

Having fully disclosed our invention, and provided teachings which will enable others to make and use our invention, the scope of our claims may now be understood as follows:

What is claimed is:

1. A dye impregnated plastic laser medium capable of lasing at frequencies above 0.65 μm, comprised of a solid resin selected from the group consisting of polymethylmethacrylate, polystyrene, epoxy and polyester polymers doped with a dye selected from the group whose structures are:

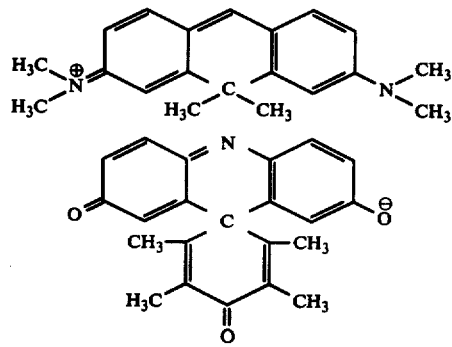

2. The lasing medium of claim 1 wherein said resin is polymethylmethacrylate and said dye is Carbazine 122.

3. The lasing medium of claim 2 wherein the concentration of said dye ranges from $5 \times 10^{-5}$ to $3 \times 10^{-3}$ molar.

4. The lasing medium of claim 1 wherein the doped profile of said medium is non-uniform.

5. The lasing medium of claim 3 wherein the doped profile of said medium is non-uniform.

6. A process for doping a solid plastic host material with a selected laser dye comprising the steps of:

forming a dye-solvent solution by admixing from $5 \times 10^{-5}$ to $3 \times 10^{-3}$ moles of a dye solute in 1000 cc of a non-ionic solvent;

adjusting the pH, if necessary, of said solution to a preselected level based on the character of said dye solute;

immersing said host material in said solution at an ambient pressure;

elevating the temperature of said solution while maintaining said concentration of said dye in said solvent;

allowing said host material to remain immersed in said solution from about one to about two weeks whereby said material will become doped with said dye;

removing said doped material from said solution; and subsequently removing excess dye-solvent solution from said material by placing said material in an oven and causing it to be exposed to an elevated temperature below 95° C for a period of from 1 to 2 weeks prior to allowing said medium to cool to ambient temperature.

7. The process of claim 6 wherein said dye-solvent solution concentration is maintained by controlling the pressure profile above said solution thereby precluding the loss of solvent or solute molecules by evaporation.

8. A process for forming a doped solid plastic laser medium having a non-uniform doped profile comprising the steps of:

forming a dye-solvent solution by admixing a laser dye and a non-ionic solvent;

adjusting the pH of said solution to a preselected level based on the character of said dye;

masking the surface of said host material as desired to create a controlled absorptive cross-sectional area;

immersing said masked host material in said solution at an ambient pressure;

maintaining the concentration of said dye-solvent solution while causing the temperature of said solution to be elevated;

allowing said host material to remain immersed in said solution for a preselected time interval;

removing said material, which will have been doped with said dye, from said solution; and subsequently removing excess solvent and dye solution remaining on said material by placing said doped material in an oven and causing it to be exposed to an elevated temperature of less than 95° C for a period of from 1 to 2 weeks prior to allowing said medium to cool to ambient temperature.

* * * * *